United States Patent
Johansson et al.

(10) Patent No.: US 11,044,767 B2
(45) Date of Patent: Jun. 22, 2021

(54) METHOD AND NETWORK NODE OF SETTING UP A WIRELESS CONNECTION

(71) Applicant: Telefonaktiebolaget LM Ericsson (publ), Stockholm (SE)

(72) Inventors: Stefan Johansson, Linköping (SE); Rasmus Axén, Linköping (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/624,799

(22) PCT Filed: Jun. 22, 2017

(86) PCT No.: PCT/SE2017/050698
§ 371 (c)(1),
(2) Date: Dec. 19, 2019

(87) PCT Pub. No.: WO2018/236261
PCT Pub. Date: Dec. 27, 2018

(65) Prior Publication Data
US 2020/0221515 A1    Jul. 9, 2020

(51) Int. Cl.
*H04W 76/11* (2018.01)
*H04W 76/15* (2018.01)

(52) U.S. Cl.
CPC ............ *H04W 76/11* (2018.02); *H04W 76/15* (2018.02)

(58) Field of Classification Search
CPC combination set(s) only.
See application file for complete search history.

(56) References Cited

U.S. PATENT DOCUMENTS

| | | | |
|---|---|---|---|
| 2015/0133081 A1 | 5/2015 | Griot et al. | |
| 2016/0057585 A1* | 2/2016 | Horn | H04W 40/02 370/312 |
| 2016/0057658 A1* | 2/2016 | Horn | H04L 47/743 370/236 |
| 2016/0127961 A1* | 5/2016 | Wang | H04W 36/0061 370/331 |
| 2016/0277961 A1 | 9/2016 | Hedman et al. | |
| 2016/0323805 A1 | 11/2016 | Ryu et al. | |
| 2018/0084475 A1* | 3/2018 | Norrman | H04W 40/02 |
| 2018/0242395 A1* | 8/2018 | Selvaganapathy | H04W 88/182 |

(Continued)

FOREIGN PATENT DOCUMENTS

| | | | |
|---|---|---|---|
| EP | 3261319 A1 | 12/2017 | |
| WO | 2016148370 A1 | 9/2016 | |

OTHER PUBLICATIONS

International Search Report and Written Opinion for International Application No. PCT/SE2017/050698, dated Mar. 8, 2018, 11 pages.

(Continued)

*Primary Examiner* — Syed Ali
(74) *Attorney, Agent, or Firm* — NDWE LLP (57) ABSTRACT

A method of setting up a wireless connection for a communication device. The method is performed in a network node and comprises receiving, from the communication device, a service request, the request comprising a destination identifier of a destination providing a service, and configuring, based on the destination identifier, the communication device for one of: multi-connectivity and single-connectivity.

9 Claims, 7 Drawing Sheets

(56) References Cited

U.S. PATENT DOCUMENTS

2019/0045583 A1\* 2/2019 Van Phan ............. H04W 76/15
2020/0068407 A1\* 2/2020 Zhang ................. H04W 12/041
2020/0214041 A1\* 7/2020 Van Phan ......... H04W 74/0833

OTHER PUBLICATIONS

Communication pursuant to Article 94(3) EPC for EP Application No. 17740812.7, dated Mar. 11, 2021, 6 pages.

\* cited by examiner

METHOD AND NETWORK NODE OF SETTING UP A WIRELESS CONNECTION

CROSS-REFERENCE TO RELATED APPLICATIONS

This application is a National stage of International Application No. PCT/SE2017/050698, filed Jun. 22, 2017, which is hereby incorporated by reference.

TECHNICAL FIELD

The technology disclosed herein relates generally to the field of wireless communications in communications system, and in particular to a method of setting up a wireless connection for a communication device, to a network node, computer program and computer program product.

BACKGROUND

There is a higher cost associated for configuring a communication device, e.g. user equipment (UE), for multi-connectivity compared to using single-connectivity. For instance, a configuration message is larger for the multi-connectivity case, UE battery consumption increases, handover drop rate increases (due to the larger messages), more measurements are typically started and more radio access network (RAN) resources are consumed by a single UE (more resources for each secondary carrier that is configured). An important advantage is the higher data rates that can be provided.

There is no doubt that there are more advantages than disadvantages of using multi-connectivity than single-connectivity. However, there is a need for balancing the advantages and disadvantages thereof, and to enable network resources to be used in the most efficient way.

SUMMARY

An objective of the present disclosure is to address and improve various aspects for use of multi-connectivity. A particular objective is to enable use of multi-connectivity in an efficient way that is not wasting network resources neither unnecessarily letting users experience only multi-connectivity disadvantages such as more frequent handover failures. These objectives and others are achieved by the methods, devices, computer programs and computer program products according to the appended independent claims, and by the embodiments according to the dependent claims.

The objective is according to an aspect achieved by a method of setting up a wireless connection for a communication device. The method is performed in a network node 30o and comprises receiving, from the communication device, a service request, the request comprising a destination identifier of a destination providing a service, and configuring, based on the destination identifier, the communication device for one of: multi-connectivity and single-connectivity.

The method provides a number of advantages. For instance, since most data sessions currently do not obtain any gain or advantages by a multi connectivity configuration the method enables to more accurately identify and provide multi-connectivity, for instance, configuring only those data sessions that actually needs higher throughput. The method also provides the advantage of reduced data session drops by keeping the connectivity configuration small when appropriate. Still another advantage is that radio access network resources can be utilized more efficiently, i.e. the method also brings about an improvement of the capacity in the radio access network. By means of the method, the battery consumption of the communication device (e.g. UE) can be reduced. The method is also usable for different types of multi-connectivity, e.g. both for carrier aggregation and dual connectivity.

The objective is according to an aspect achieved by a computer program for a network node for setting up a wireless connection. The computer program comprises computer program code, which, when run on at processing circuitry of the network node causes the network node to perform the method as above.

The objective is according to an aspect achieved by a computer program product comprising a computer program as above and a computer readable means on which the computer program is stored.

The objective is according to an aspect achieved by a network node for setting up a wireless connection for a communication device. The network node is configured to: receive, from the communication device, a service request, the request comprising a destination identifier of a destination providing a service, and configure, based on the destination identifier, the communication device for one of: multi-connectivity and single-connectivity.

Further features and advantages of the embodiments of the present teachings will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

As indicated in the background section, there are more advantages than disadvantages of using multi-connectivity. This is true at least for the case where the UE data session is large and/or has a long duration. However, such data sessions are less frequent than the data sessions for which multi-connectivity would not improve the user experience and would hence not necessarily be needed. Currently, there is no way of distinguishing these data sessions from each other, and a UE having data sessions which do not need multi-connectivity may thus experience only the disadvantages. The network resources may also be used inefficiently if multi-connectivity is used in cases where it is actually not needed.

Briefly, in order to address the above challenges the present teachings suggest, in different embodiments, the collecting of data session sizes in relation to destination Internet Protocol (IP) addresses and the use of this information for deciding on type of connection to be configured for communication devices, thereby enabling to more accurately configure the communication devices for multi-connectivity.

Figure 1:
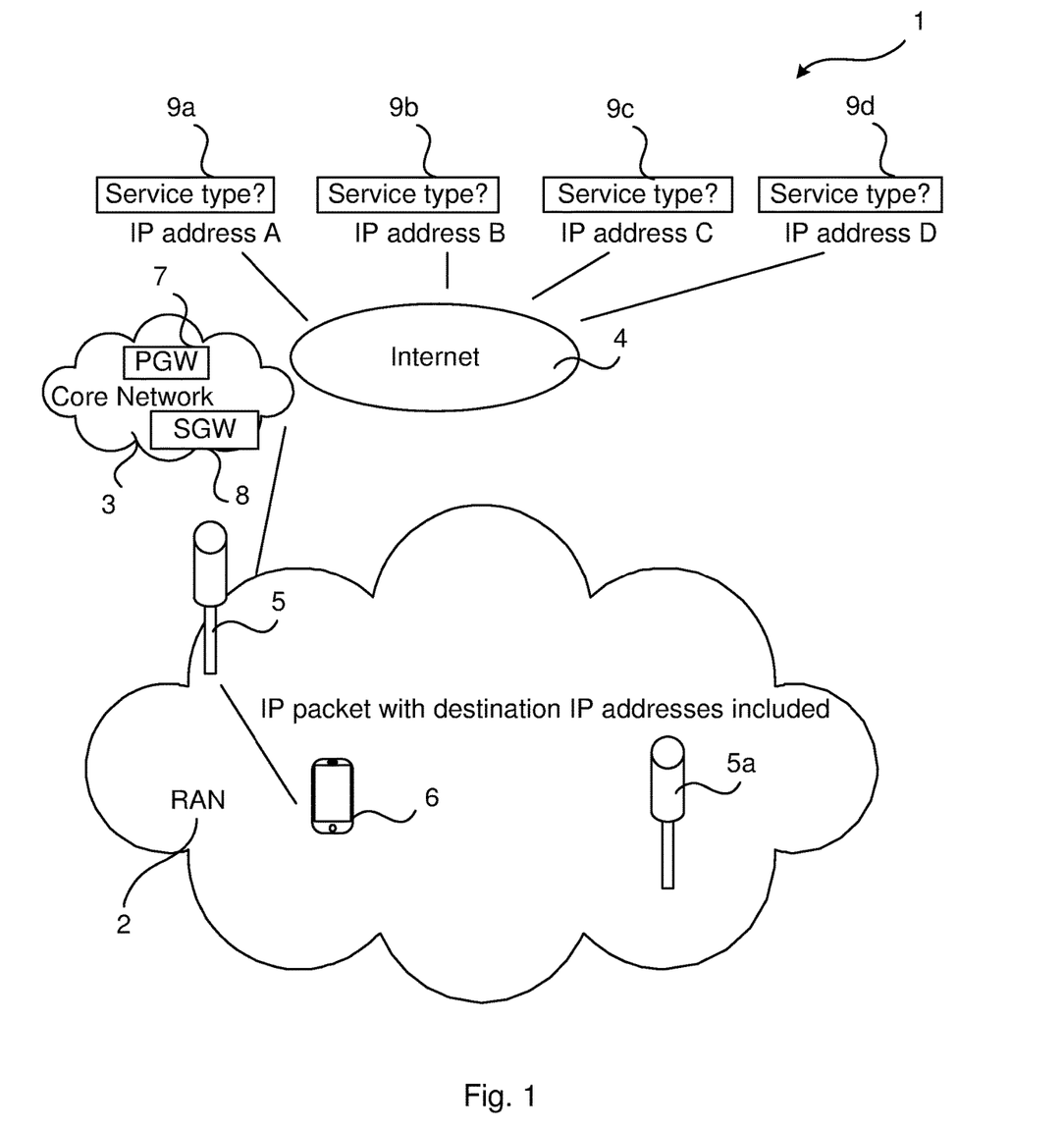
FIG. 1 illustrates schematically an environment in which embodiments according to the present teachings may be implemented.

FIG. 1 illustrates schematically a communications system 1 in which embodiments according to the present teachings may be implemented. The communication system 1 comprises a radio access network 2 (RAN) enabling wireless communication for communication devices 6, such as, for instance, UEs (UEs are used in the following as example). The RAN 2 may, for instance, implement Long Term Evolution (LTE) protocols or some other radio interface communication. The RAN 2 comprises a number of access nodes 5, 5a such as, for instance, evolved NodeBs (eNBs) or next generation NodeBs (gNB). The access node 5, 5a communicates with the UEs 6 over wireless links.

The core network 3 is in turn connected to data networks 4, e.g. Internet 4, comprising interconnected computers using an Internet protocol (IP) suite. IP delivers data packets from a source node to a destination node based on IP addresses in the packet headers. For instance, the UE 6 may send an IP packet with a destination IP address included, and the IP packet is sent over the Internet 4 to a destination server 9a, 9b, 9c, 9d. In the FIG. 1, a number of destination servers 9a, 9b, 9c, 9d are illustrated, each providing services to users. A first such destination server 9a may be reached based on an IP address denoted IP address A. Correspondingly, a second, third and fourth destination server 9b, 9c, 9d may be reached based on an IP address denoted IP addresses B, C and D respectively.

The communications system 1 may comprise a core network 3 (also denoted backbone network), in turn comprising various nodes. Non-exhaustive examples on such nodes are authentication nodes, charging nodes, gateways, routers and switches.

As a particular example, the core network of Long Term Evolution (LTE) comprises public data network gateway (PGW) and serving gateway (SGW). The PGW 7 provides connectivity from the UE 6 to external packet data networks, e.g. the Internet 4. The SGW 8 routes and forwards user data packets.

Figure 2:
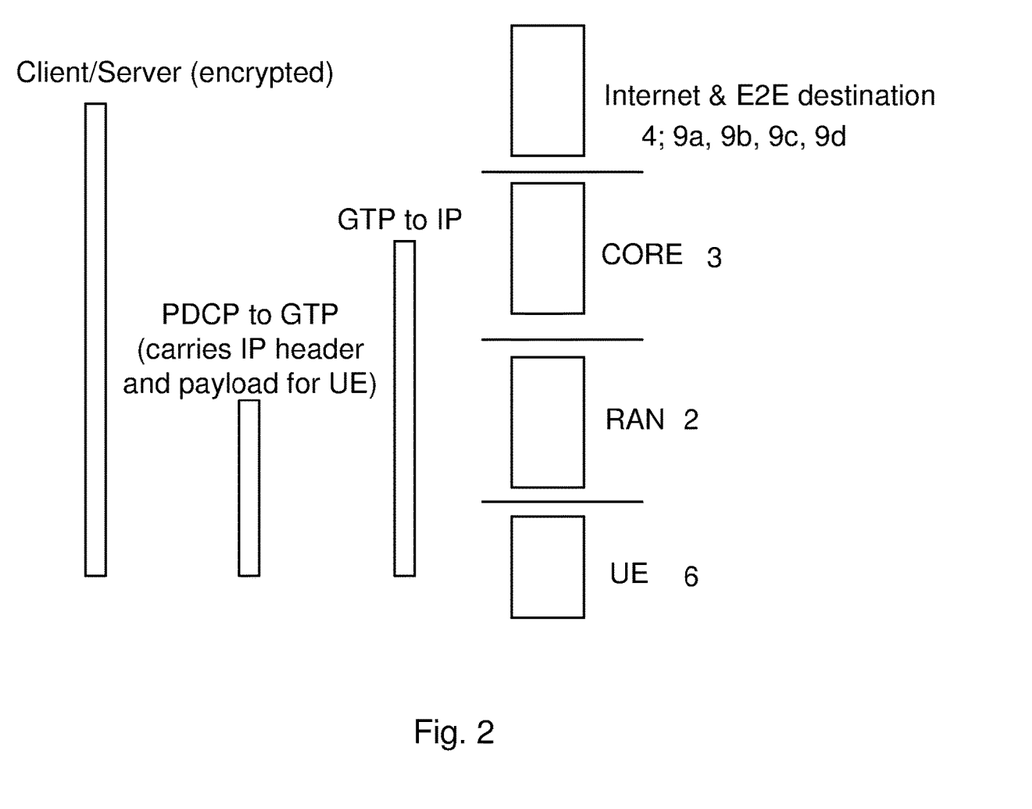
FIG. 2 illustrates protocol stacks applicable for the present teachings.

FIG. 2 illustrates a simplified protocol stack applicable for the present teachings. There are different types of multi-connectivity, for instance, carrier aggregation and dual connectivity. Carrier aggregation is used for combining several carriers for a UE 6 in order to achieve higher data rates. The aggregation is performed at Media Access Control (MAC) layer. Dual connectivity is used for same purpose as carrier aggregation but the aggregation is performed at Packet Data Convergence Protocol (PDCP) level. PDCP is provided in the UE 6 and in the access nodes 5, 5a and is one of the user plane protocols used in LTE. The PDCP sends and receives packets to and from the UE 6 and the access points 5a, 5b over the air interface.

The PDCP layer works on top of Radio Link Control (RLC) and transfers uplink (UL) packets to a General Packet Radio Service (GPRS) Tunneling Protocol (GTP) layer which in turn tunnels the packets through the core network 3. That is, in an End-to-end (E2E) path IP packets from the UE 6 are forwarded through the GTP tunnel from eNB 5a, 5b to S-GW and from S-GW 8 to P-GW 7, and the IP packets are then forwarded from the P-GW 7 to the Internet 4. The PDCP layer receives downlink packets from the GTP layer and sends them onto RLC which in turn sends them to the UE 6.

The above can be summarized by:

Multi-carrier configuration is performed between the RAN 2 and the UE 6, while PDCP is sent between UE 6 and RAN 2 (IP inside).

GTP is used between the RAN 2 and the core network 3 (IP inside).

The core network 3 forwards IP to Internet 4 and destination 9a, 9b, 9c, 9d.

The RAN 2 can peek at IP destination address.

The size and length of a data session are highly dependent on what type of service the user is utilizing. The UE 6 can use multiple services. Exactly what types theses services are is unknown, and it is not possible to check the data content of the data session since it is typically protected for eavesdropping purposes, for instance, by HyperText Transfer Protocol Secure (https), and/or encrypted for privacy reasons. Instead of checking the actual data content the IP destination is, according to various embodiments, looked at and then it may be determined if this type of destination address usually result in a big and/or long data session. By detecting this association between an destination address and characteristics of the corresponding data sessions, an early setup of multi-connectivity can be provided for those UEs 6 that really need it and for those UEs that do not need it the drawbacks of multi-connectivity can be avoided.

As an example on the above: a data session between the UE 6 and an on-demand video server, e.g. a service provider having IP addresses A, will likely generate a big and/or long data session. Currently, it is only when detecting this that the configuring of the multi-connectivity for this UE 6 can be done. Another example where it is also beneficial to use multi-connectivity is speed test servers (i.e. servers that send a predefined set of data in order to observe network performance).

It is not necessary, and even disadvantageous, to configure (in the RAN 2) the destination IP-addresses that generates a certain type of traffic (e.g. resource demanding services, such as the on-demand video). To configure such destination IP-addresses in the RAN 2 would require the RAN operator to have knowledge of destination addresses outside their RAN 2. Instead and in accordance with various embodiments, earlier sessions are learned from and the knowledge may be spread dynamically throughput the RAN 2.

Since big and/or long data sessions are (currently) more uncommon than small data sessions a whitelist is, in preferred embodiments, stored in the access nodes 5, 5a and/or in a more centrally located node, e.g. a node in the core network 3. In the whitelist highly data intensive services (i.e. the IP-addresses that match these) services are mapped. That is, such whitelist may, for instance, map (i.e. associate) the data intensive services to their corresponding IP-addresses. What type of service, i.e. what the service actually does, is of no importance for the RAN 2, instead the size and/or duration of the service is considered.

New services are being added to Internet 4 and those no longer popular are being removed. The access node 5, 5a, in the following exemplified by eNB 5, 5a, may check the destination address of the IP packets, not the serviced involved. In other embodiments, another node may check the destination on behalf of the eNB 5, 5a. In LTE, for instance, nodes such as the PGW 7 or SGW 8 may perform the destination check-up and forward the result to the eNB 5, 5a. This checking may also be performed by other analytic tools and sent to eNB 5, 5a or gNBs.

The RAN 2 collects session data and either stores this information locally (e.g. in a database or data storage as a list mapping data intensive services to IP-addresses providing such services) or sends reports to central parts of the RAN 2. The RAN 2 in turn distributes the IP-address lists that generate big long data sessions to each eNB 5, 5a in the RAN 2.

The eNB 5, 5a may monitor the data session per destination IP-address. For instance, the eNB 5, 5a may be monitoring and detect that IP packets, when IP-address A is involved, results in a long data session with a high data volume. For IP-address B it could detect that the data session only results in small data transmissions. So, for sessions where IP-address A is involved, multi-connectivity would be useful but for session where IP address B is involved then multi-connectivity would not be beneficial.

Multiple eNBs 5, 5a can contribute to a central location (or to an appointed eNB) where a more complete picture can be obtained on which services that would benefit from multi-connectivity. This more complete picture (e.g. in form of a list) may be distributed or fetched by each eNB 5, 5a when deciding on whether or not to use multi-connectivity.

Figure 3:
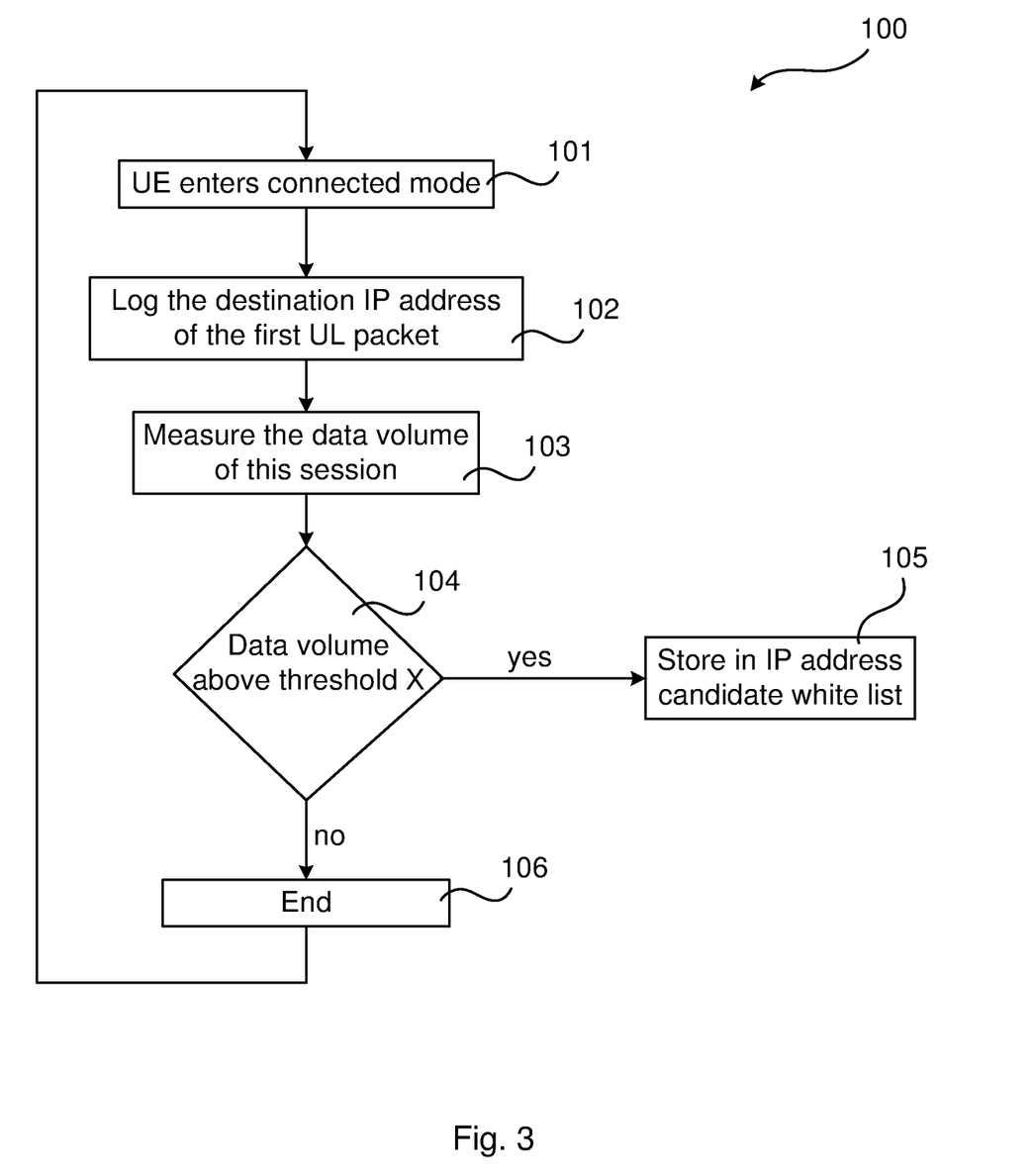
FIG. 3 is a flow chart over embodiments according to the present teachings, in particular for identifying destinations based on single communication devices.

FIG. 3 is a flow chart over embodiments according to the present teachings, in particular for identifying destinations based on single communication devices. The algorithm in FIG. 3 describes an IP flow classification wherein an evaluation is made on a "per UE basis". The algorithm may be used for finding IP addresses that are good candidates for a multi-connectivity configuration for a certain UE. The algorithm may be implemented in e.g. the access node 5, 5a such as eNB, in the SGW 8 or Operational Support System/Network Manager (OSS/NM). These examples relates to RANs 2 implementing LTE, and in other systems, the algorithm may be implemented in corresponding nodes may.

The flow 100 starts in box 101, wherein the UE 6 enters a connected mode.

In box 102, when the UE requests a service a destination identifier, e.g. a destination IP address, of the first uplink (UL) is logged.

In box 103, the total data volume of the data session providing the service is measured. The data volume may, for instance, be measured in number of bytes. Thus, for each data session, the initial IP address (or other destination identifier) and the total data volume is logged.

In decision box 103, it is determined if the data volume meets a criterion for the service being considered as a data intensive service. The criterion may, for instance, be that if the data volume is above a certain threshold X, then the IP address is logged in an IP address candidate whitelist as an IP address providing data intensive services. Hence, if in decision box 104, the outcome is "yes" (i.e. criterion fulfilled, e.g. data volume above threshold X), then flow continues to box 105, wherein the IP address is stored in a candidate white list. If in decision box 104, the outcome is "no" (i.e. criterion not fulfilled, e.g. data volume below threshold X), then flow continues to box 106, wherein the flow 100 ends, and the UE 6 may, for instance, continue receiving the service, request another service or enter an idle mode.

Figure 4:
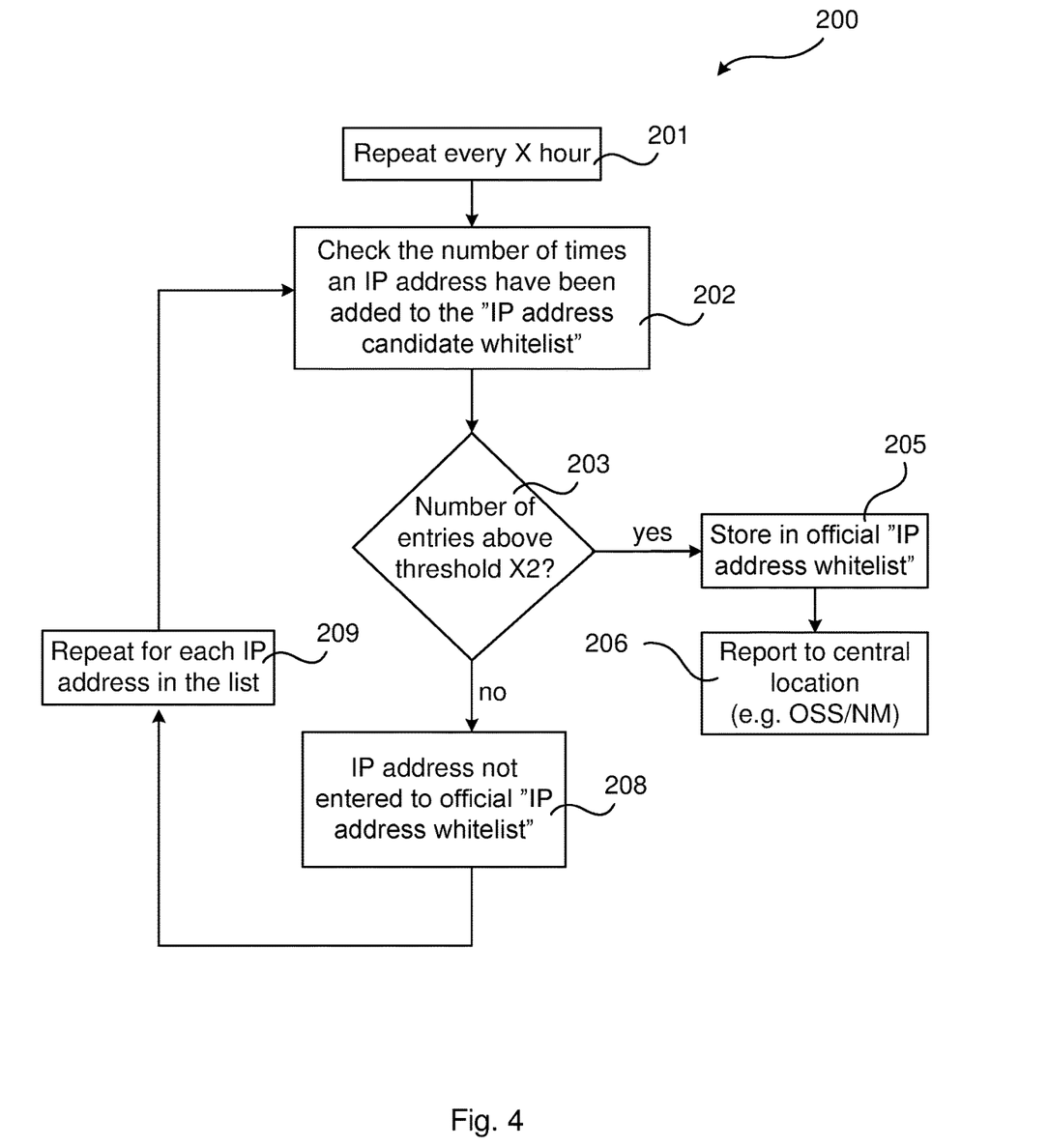
FIG. 4 is a flow chart over embodiments according to the present teachings, in particular for keeping updated destinations.

FIG. 4 is a flow chart over embodiments according to the present teachings, in particular for keeping updated destinations. The candidate whitelist described earlier may be used for keeping an official "IP address whitelist" up to date, as services are added or removed.

The flow 200 starts in box 201, wherein a rate is set for determining repetition frequency. For instance, and as illustrated in FIG. 4, the flow may be repeated every Xth hour (e.g. every hour, every second hour, every half hour etc.). It is noted that this step 201 need not be performed each time the flow 200 is run, and that the flow 200 may be run at predetermined intervals once set until any change is needed.

In box 202, a candidate IP address of the candidate IP address whitelist is selected, and the number of times this candidate IP address has been added to the candidate whitelist is determined. The flow 200 then continues to decision box 203.

In decision box 203, it is determined whether or not the number of entries associated with the candidate IP address is above a threshold X2. If in decision box 203, the outcome is "yes" (i.e. criterion fulfilled, e.g. number of entries above threshold X2), then flow continues to box 205, wherein the IP address is stored in the official IP address whitelist. In box 205 or in a separate box 206, the IP address white list may be reported to a central location, such as e.g. OSS/NM nodes. This reporting, i.e. the new entries in the official IP address whitelist may be performed once all candidate IP addresses of the candidate IP address whitelist have been traversed, or it may be reported after each update. The central location may, but need not, be placed in the so-called "cloud". The central location can ensure that all eNBs 5, 5a have a synchronized view of the official "IP Address white list".

If in decision box 203, the outcome is "no" (i.e. criterion not fulfilled, e.g. number of entries below threshold X2), then flow continues to box 208 and the candidate IP address is not "promoted" to the official IP address whitelist. The address may be removed from the candidate IP whitelist, or else nothing is done.

The flow 200 continues to box 209, wherein next candidate IP address of the candidate IP address whitelist is obtained and the flow is repeated from box 202 and onwards until all IP addresses has been traversed.

Figure 5:
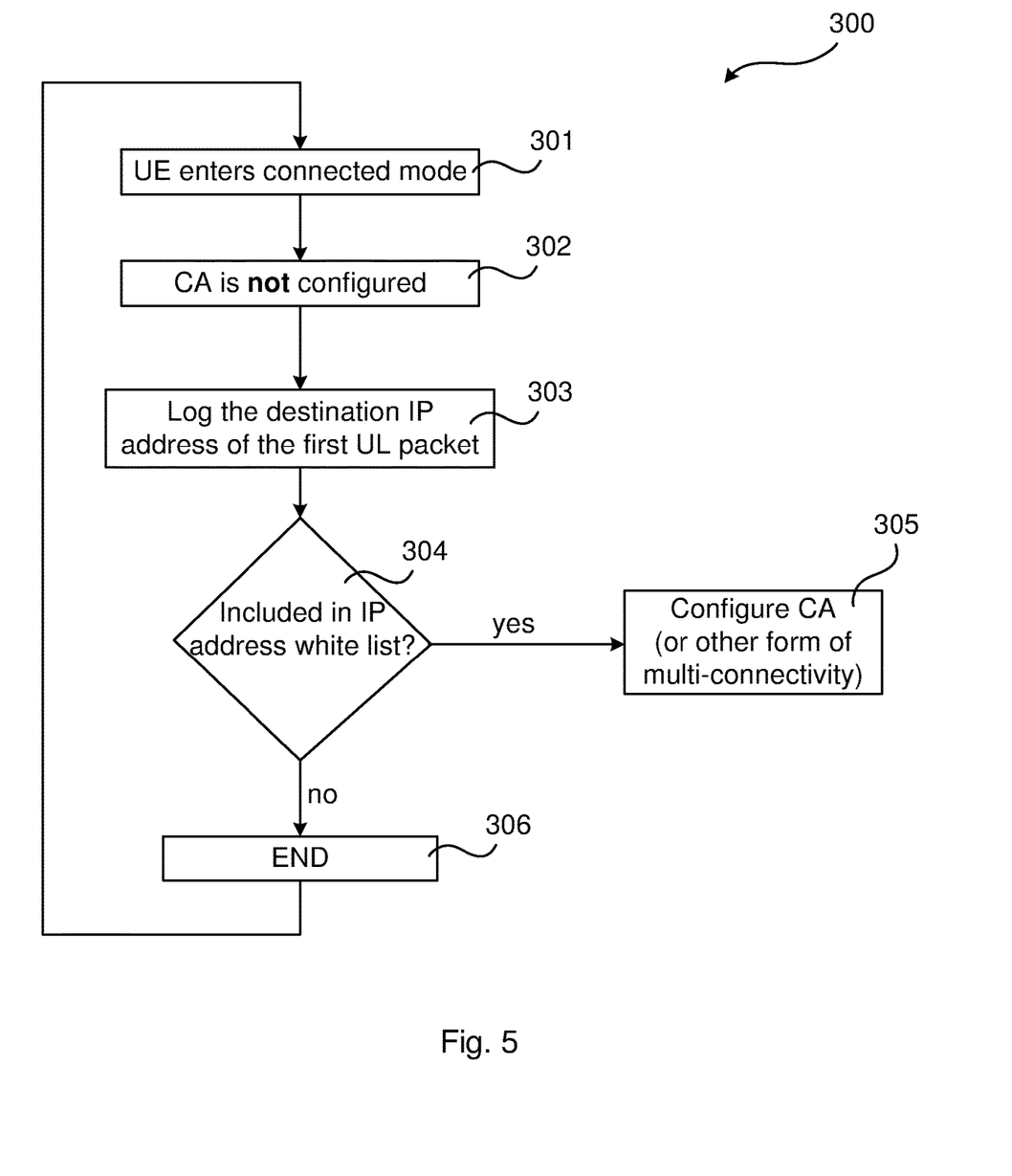
FIG. 5 is a flow chart over embodiments according to the present teachings, in particular for deciding on form of connectivity.

FIG. 5 is a flow chart over embodiments according to the present teachings, in particular a flow 300 for deciding on form of connectivity. In particular, the flow 300 is an exemplary way of how the official "IP Address white list" may be applied in order to determine when to configure multi-connectivity, such as e.g. Carrier Aggregation (CA) or any other form of multi-connectivity.

The flow 300 starts in box 301, when a UE 6 to be configured enters connected mode. In box 302 it is established that the UE 6 does not have a multi-connectivity configured (CA is used as example in the flow chart).

In box 303, the destination identifier, e.g. a destination IP address, of the first uplink (UL) packet that the UE 6 sends is determined and flow 300 continues to decision box 304.

In decision box 304, it is determined whether or not the destination identifier is included in the official IP address whitelist. If the outcome is "yes", then flow continues to box 305, wherein the UE 6 is configured with multi-connectivity. If the outcome instead is "no", then flow continues to box 306, wherein the flow 300 ends. The flow 300 may then be repeated, as indicated by the arrow from box 306 to box 301, if, for instance, the UE 6 has entered idle mode and subsequently again enters connected mode, or if the UE 6 requests a new service.

The algorithm shown in flow 300 illustrates an efficient way of deciding when to configure a UE 6 with Carrier Aggregation (or other form of multi-connectivity). Only UEs that have a session that is initiated towards an IP address found in the official IP Address white list are configured with Carrier Aggregation. The algorithm described in relation to FIG. 5 can be run separately from the algorithm described in relation to FIG. 3. However, the algorithm in FIG. 5 is preferably implemented in a node of the RAN (e.g. eNB 5, 5a).

The various embodiments and the features thereof can be combined in many different ways, examples of which are given in the following.

Figure 6:
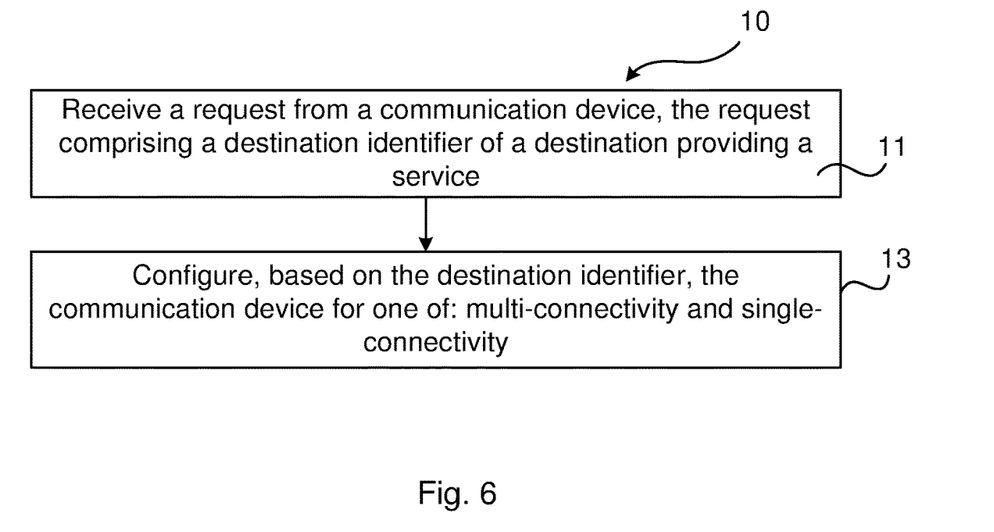
FIG. 6 is a flow chart over steps of a method in a network node according to embodiments of the present teachings.

FIG. 6 is a flow chart over steps of a method in a network node according to embodiments of the present teachings.

A method 10 of setting up a wireless connection for a communication device 6 is provided. The method 10 is performed in a network node 5, for instance an access node as described in relation to FIG. 1. Some exemplary network nodes, in which embodiments of the method 10 may be implemented are: eNB, Serving Gateway 8 and OSS/NM. It is noted that these exemplary are from within the LTE domain, and that the method 10 may be implemented in other network nodes using a different radio access technology (RAT) than LTE. For other RATs the method 10 may be implemented in corresponding nodes.

The method 10 comprises receiving 11, from the communication device 6, a service request. The request comprises a destination identifier of a destination providing a service. The destination providing a service may, for instance, be an application server of the Internet. The destination identifier may, for instance, be an IP address.

The method 10 comprises configuring 13, based on the destination identifier, the communication device 6 for one of: multi-connectivity and single-connectivity. The destination identifier, for instance an IP address, may be indicated e.g. in a list as a provider of services that typically are data intensive and therefore would benefit from 30o a multi-connectivity configuration. The network node 5 may have access to such list or obtain such information from another node, whereby the network node 5 is able to properly configure 14 the communication device 6.

Figure 7:
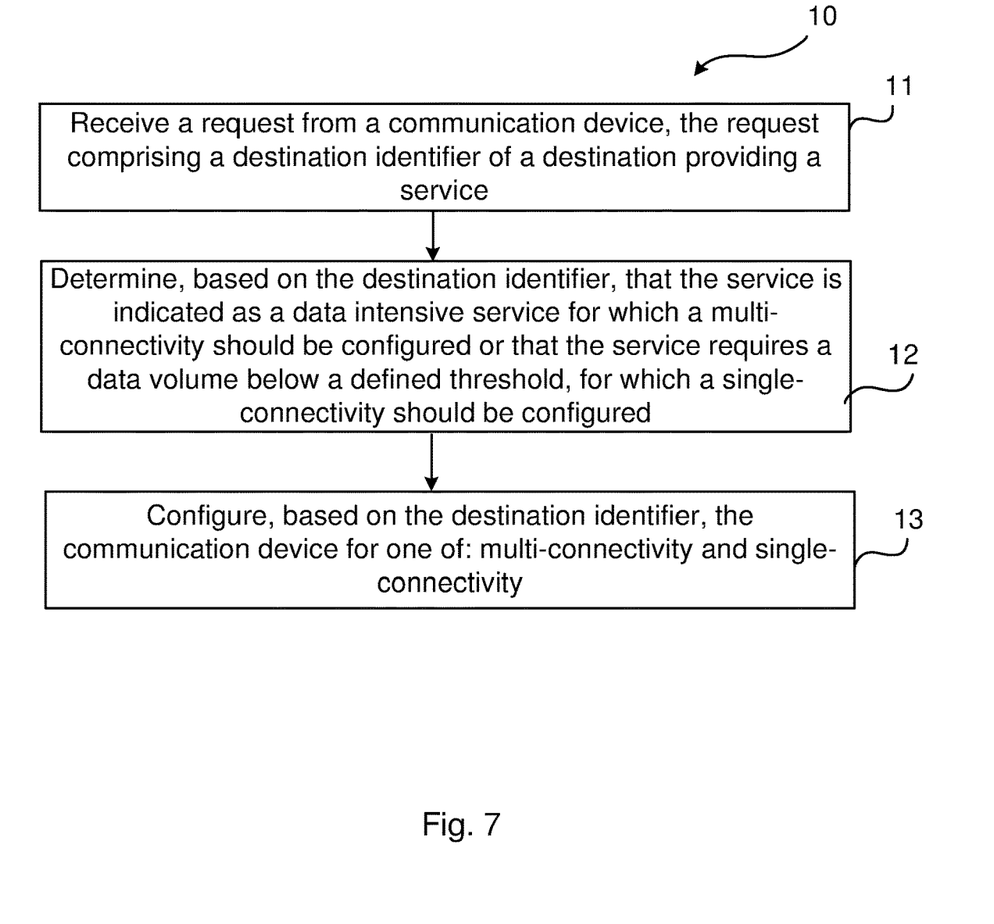
FIG. 7 is a flow chart over steps of a method in a network node according to embodiments of the present teachings.

FIG. 7 is a flow chart over steps of a method in a network node according to an embodiment of the present teachings. In this embodiment, the method 10 as described above with reference to FIG. 6, comprises, prior to the configuring 13, determining 12, based on the destination identifier, that the service is indicated as a data intensive service for which a multi-connectivity should be configured or that the service requires a data volume below a defined threshold, for which a single-connectivity should be configured.

In such embodiment, the method 10 thus comprises receiving the service request from the communication device 6, and determining 12 based on the destination identifier, that the service is either indicated as a data intensive service upon which the communication device 6 is configured for multi-connectivity, or that the service is a indicated as a service requiring a data volume below a defined threshold, upon which the communication device 6 is configured for single-connectivity. A data service may be considered (or defined) as a data intensive service based, for instance, on one or more of: the data volume (e.g. measured in bytes) of the service, the required data transfer rate of the service (e.g. measured in kilobytes per second, kB/s) and the duration of the service (e.g. measured in seconds).

With reference to FIGS. 6 and 7, further embodiments of the method 10 are described.

In various embodiments, the determining 12 comprises comparing the destination identifier to entries of a list of data intensive services and upon finding a match determining that the service is indicated as a data intensive service, and upon failing to find a match determining the service is a service requiring a data volume below a defined threshold.

In various embodiments, the method 10 comprises, after the configuring 13 of a single-connectivity for the communication device 6, measuring a data volume of the service data session, and for the case that the measured data volume is above a defined threshold value, entering the destination identifier to a list of candidate multi-connectivity services.

In a variation of the above embodiment, the method 10 comprises determining the number of times the destination address have been entered to the list of candidate multi-connectivity services and for the case the number meets a criterion entering the destination address to a list of data intensive services.

In various embodiments, the destination identifier is indicated as a multi-connectivity service based on information on previous data sessions to a destination pointed at by the destination identifier. When the destination identifier is indicated as a multi-connectivity service, then traffic to the destination (that is identified by the destination identifier) is given multi-connectivity, e.g. carrier aggregation or dual connectivity. For instance, the communication device 6 that requests a service from a destination that is indicated as a multi-connectivity service will be configured with multi-connectivity for communication with the destination. Information on previous data sessions may, for instance, be information on data volumes and/or data rates from/to the destination identified by the destination identifier. Further details on how to identify a destination as a multi-connectivity service have been given earlier, e.g. in relation to FIG. 3.

Figure 8:
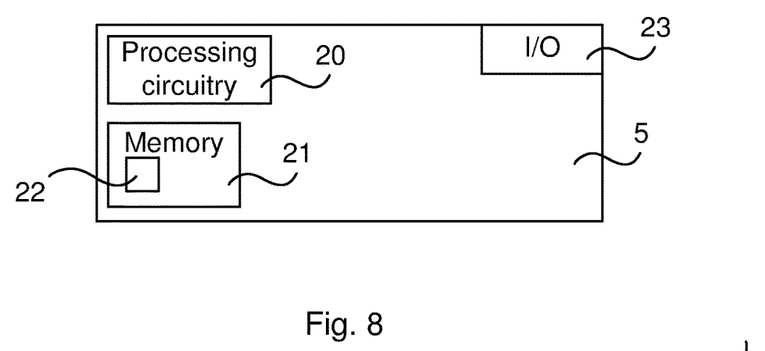
FIG. 8 illustrates schematically a network node and means for implementing embodiments of the method in accordance with the present teachings.

FIG. 8 illustrates schematically a network node and means for implementing embodiments of the method in accordance with the present teachings. The network node 5 comprises processing circuitry 20, which may be any combination of one or more of a suitable central processing unit (CPU), multiprocessor, microcontroller, digital signal processor (DSP), etc., capable of executing software instructions stored in a computer program product 21, e.g. in the form of a storage medium 21. The processing circuitry 20 may further be provided as at least one application specific integrated circuit (ASIC), or field programmable gate array (FPGA).

The processing circuitry 20 is configured to cause the network node 5 to perform a set of operations, or steps, e.g. as described in relation to one or more of FIGS. 3-7. For example, the storage medium 21 may store the set of operations, and the processing circuitry 20 may be configured to retrieve the set of operations from the storage medium 21 to cause the network node 5 to perform the set of operations. The set of operations may be provided as a set of executable instructions. The processing circuitry 20 is thereby arranged to execute methods as disclosed herein.

The storage medium 21 may also comprise persistent storage, which, for example, can be any single one or combination of magnetic memory, optical memory, solid state memory or even remotely mounted memory.

The network node 5 also comprises an input/output means 23 (denoted I/O) for communicating wirelessly and/or in a wired manned with other entities and devices. The input/output means 23 may, for instance, comprise a protocol stack, for communication with other network nodes in a wired manner and/or with communication devices in a wireless manner. The input/output means 23 may be used for receiving data input and for outputting data, e.g. conveying IP packets. The network node 5 may comprise receiving circuitry and transmitting circuitry 23. The network node 5 may also comprise or be connected to an antenna device (not shown), e.g. radio antenna, for wireless communication with the communication devices 6 over a wireless link.

A network node 5 is provided for setting up a wireless connection for a communication device 6, e.g. a UE. The network node 5 is configured to:
receive, from the communication device 6, a service request, the request comprising a destination identifier of a destination providing a service, and
configure, based on the destination identifier, the communication device 6 for one of: multi-connectivity and single-connectivity.

The network node 5 may be configured to perform the above steps, and implement any of the described embodiments of e.g. the method 30, e.g. by comprising one or more processors 20 (or processing circuitry) and memory 21, the memory 21 containing instructions executable by the processor 20, whereby the network node 5 is operative to perform the steps.

In an embodiment thus, a network node 5 is provided, for setting up a wireless connection for a communication device 6. The network node 5 comprises one or more processors 20 and memory 21, the memory 21 containing instructions executable by the processor 20, whereby the network node 5 is operative to: receive, from the communication device 6, a service request, the request comprising a destination identifier of a destination providing a service, and configure, based on the destination identifier, the communication device 6 for one of: multi-connectivity and single-connectivity.

In an embodiment, the network node 5 is configured to, prior to the configuring:
determine, based on the destination identifier, that the service is indicated as a data intensive service for which a multi-connectivity should be configured or that the service requires a data volume below a defined threshold, for which a single-connectivity should be configured.

In various embodiments, the network node 5 is configured to determine by comparing the destination identifier to entries of a list of data intensive services and configured to, upon finding a match, determine that the service is indicated as a data intensive service, and upon failing to find a match, to determine that the service is a service requiring a data volume below a defined threshold.

In various embodiments, the network node 5 is configured to measure, after the configuring of a single-connectivity for the communication device 6, a data volume of the service data session, and for the case that the measured data volume is above a defined threshold value, enter the destination identifier to a list of candidate multi-connectivity services.

In various embodiments, the network node 5 is configured to determine the number of times the destination address has been entered to the list of candidate multi-connectivity services and for the case the number meets a criterion configured to enter the destination address to a list of data intensive services.

In various embodiments, the destination identifier is indicated as a multi-connectivity service based on information on previous data sessions to a destination pointed at by the destination identifier.

Figure 9:
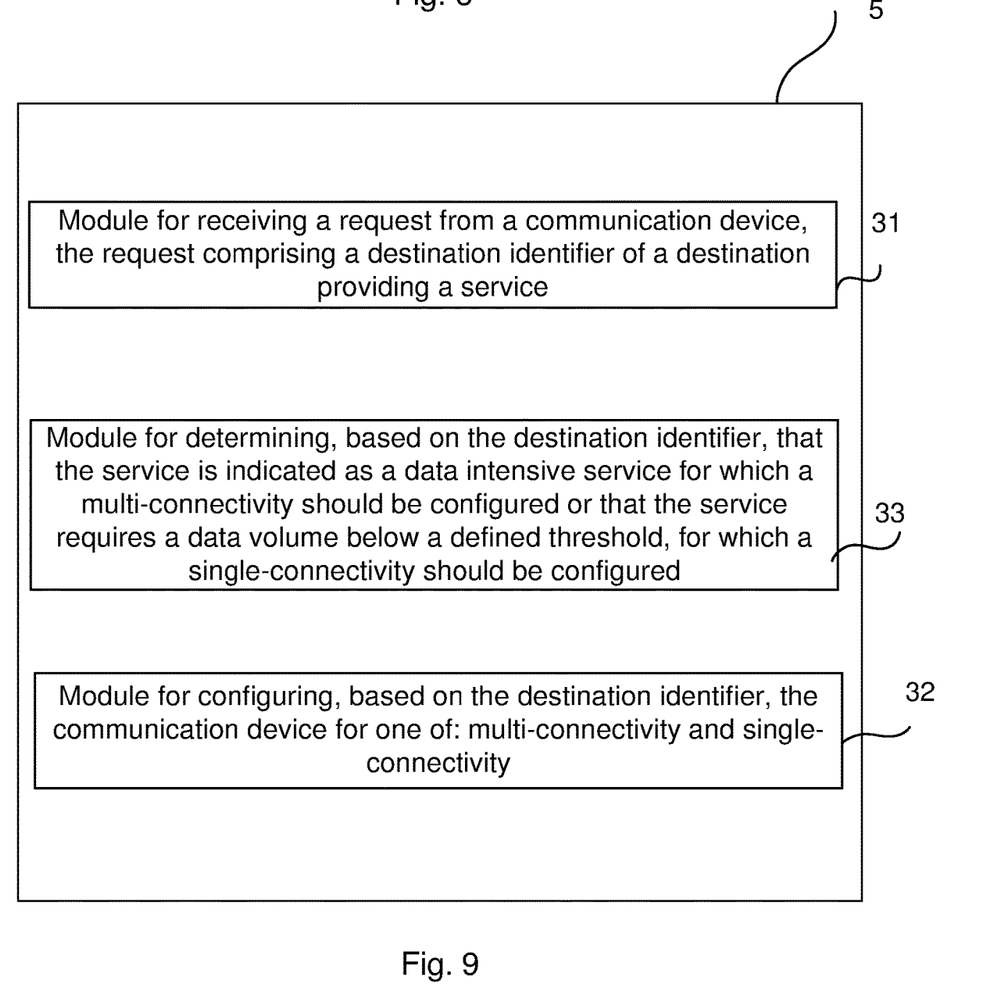
FIG. 9 illustrates a network node comprising function modules/software modules for implementing embodiments of the present teachings.

FIG. 9 illustrates a network node comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 10 that has been described in various embodiments.

A network node 5 is provided for setting up a wireless connection for a communication device. The network node comprises a first module 31 for receiving, from the communication device, a service request, the request comprising a destination identifier of a destination providing a service. The first module 31 may, for instance, comprise processing circuitry adapted to receive service requests. In other embodiments, the first module 31 may comprises receiving circuitry for receiving wireless communication from communication devices.

The network node comprises a second module 32 for configuring, based on the destination identifier, the communication device for one of: multi-connectivity and single-connectivity. The second module 32 may, for instance, comprise processing circuitry adapted for configuring the communication device for either multi-connectivity or single-connectivity.

In some embodiment, the network node comprises a third module 33, for determining, based on the destination identifier, that the service is indicated as a data intensive service for which a multi-connectivity should be configured or that the service requires a data volume below a defined threshold, for which a single-connectivity should be configured. The third module 33 may, for instance, comprise processing circuitry adapted to take the destination identifier as input and determine based thereon whether to configure multi-connectivity or single-connectivity.

It is noted that one or more of the modules 31, 32, 33 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:
1. A method of setting up a wireless connection for a communication device, the method being performed in a network node and comprising:
receiving, from the communication device, a service request, the request comprising a destination identifier of a destination providing a service; and
configuring, based on the destination identifier, the communication device for multi-connectivity or single-connectivity by:
configuring the communication device for multi-connectivity when the destination identifier is indicated as a multi-connectivity service based on information on previous data sessions to a destination pointed at by the destination identifier; and
configuring the communication device for single-connectivity and measuring a data volume of a service data session, and when the measured data volume is above a defined threshold value, entering the destination identifier to a list of candidate multi-connectivity services, in which when a number of times the destination identifier has been entered to the list of candidate multi-connectivity services meets a criterion, indicating the destination identifier to receive multi-connectivity service.

2. The method as claimed in claim 1, wherein the measured data volume indicates a data intensive service for multi-connectivity.

3. The method as claimed in claim 1 further comprising, comparing the destination identifier to the list of candidate multi-connectivity services for configuring the communication device for multi-connectivity.

4. A non-transitory computer readable storage medium containing instructions which, when executed by processing circuitry of a network node, are capable of causing the network node to perform operations to set up a wireless connection for a communication device comprising:
   receiving, from the communication device, a service request, the request comprising a destination identifier of a destination providing a service; and
   configuring, based on the destination identifier, the communication device for multi-connectivity or single-connectivity by:
      configuring the communication device for multi-connectivity when the destination identifier is indicated as a multi-connectivity service based on information on previous data sessions to a destination pointed at by the destination identifier; and
      configuring the communication device for single-connectivity and measuring a data volume of a service data session, and when the measured data volume is above a defined threshold value, entering the destination identifier to a list of candidate multi-connectivity services, in which when a number of times the destination identifier has been entered to the list of candidate multi-connectivity services meets a criterion, indicating the destination identifier to receive multi-connectivity service.

5. The non-transitory computer readable storage medium as claimed in claim 4, wherein the measured data volume indicates a data intensive service for multi-connectivity.

6. The non-transitory computer readable storage medium as claimed in claim 4, wherein the instructions are capable of causing the network node to perform further operations comprising, comparing the destination identifier to the list of candidate multi-connectivity services for configuring the communication device for multi-connectivity.

7. A network node for setting up a wireless connection for a communication device, the network node comprising:
   a processing circuitry; and
   a memory containing instructions which, when executed on the processing circuitry, cause the network node to:
      receive, from the communication device, a service request, the request comprising a destination identifier of a destination providing a service; and
      configure, based on the destination identifier, the communication device for multi-connectivity or single-connectivity by performing operations to:
         configure the communication device for multi-connectivity when the destination identifier is indicated as a multi-connectivity service based on information on previous data sessions to a destination pointed at by the destination identifier; and
         configure the communication device for single-connectivity and measure a data volume of a service data session, and when the measured data volume is above a defined threshold value, enter the destination identifier to a list of candidate multi-connectivity services, in which when a number of times the destination identifier has been entered to the list of candidate multi-connectivity services meets a criterion, indicate the destination identifier to receive multi-connectivity service.

8. The network node as claimed in claim 7, wherein the measured data volume indicates a data intensive service for multi-connectivity.

9. The network node as claimed in claim 7 further comprising, to compare the destination identifier to the list of candidate multi-connectivity services for configuring the communication device for multi-connectivity.

* * * * *